US007839881B2

(12) United States Patent (10) Patent No.: US 7,839,881 B2
Lee et al. (45) Date of Patent: Nov. 23, 2010

(54) PROJECTION HEADSET

(75) Inventors: Barry J. Lee, Santa Cruz, CA (US);
Timothy Paul Johnston, Los Gatos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 118 days.

(21) Appl. No.: 12/247,029

(22) Filed: Oct. 7, 2008

(65) Prior Publication Data

US 2009/0034713 A1 Feb. 5, 2009

Related U.S. Application Data

(63) Continuation-in-part of application No. 11/492,508, filed on Jul. 24, 2006.

(51) Int. Cl.
*H04M 1/00* (2006.01)
*H04M 9/00* (2006.01)
(52) U.S. Cl. .................................. 370/430; 455/575.2
(58) Field of Classification Search .............. 381/370, 381/381, 384; 379/430, 428.01, 428.02; 455/569.1, 575.2; 345/168
See application file for complete search history.

(56) References Cited

U.S. PATENT DOCUMENTS

| 6,388,657 | B1 * | 5/2002 | Natoli ........................ 345/168 |
| 2003/0001823 | A1 | 1/2003 | Oya et al. |
| 2003/0092384 | A1 | 5/2003 | Ross |
| 2006/0103590 | A1 | 5/2006 | Divon |

FOREIGN PATENT DOCUMENTS

| EP | 0531645 A | 3/1993 |
| EP | 1223729 A | 7/2002 |
| JP | 2000152202 A | 5/2000 |

OTHER PUBLICATIONS

Symbol Technologies, Inc. Preliminary Specifications: Laser Projection Display (LPD). Jul. 2002. U.S.A.
Wittenberg, Carl. Ultra-miniature projector: A high resolution, battery powered laser display. New England Chapter Society for Information Display. Jan. 25, 2007.
International Search Report in PCT/US2007/016242, mailed Apr. 24, 2008.
Written Opinion of the International Searching Authority in PCT/US2007/016242, mailed Apr. 24, 2008.
The International Bureau of WIPO. International Preliminary Report on Patentability: PCT/US2007/016242. Jan. 2009. Geneva, Switzerland.

\* cited by examiner

*Primary Examiner*—Tuan D Nguyen
(74) *Attorney, Agent, or Firm*—David S. Park; Haynes Boone, LLP

(57) ABSTRACT

A headset apparatus including a virtual keypad and a method for inputting data into a headset are provided. In one embodiment, a headset includes a processor, at least one acoustic transducer, a projector operably coupled to the processor for displaying an image on a surface exterior to the headset, and a position detector operably coupled to the processor for determining an image position and a user finger position.

20 Claims, 6 Drawing Sheets

Display

Pos'n Detected

Pos'n Selected

PROJECTION HEADSET

CROSS-REFERENCE TO RELATED APPLICATIONS

This application is a continuation-in-part of U.S. patent application Ser. No. 11/492,508 filed Jul. 24, 2006, the contents of which are incorporated by reference herein for all purposes.

TECHNICAL FIELD

The present invention relates generally to headset devices and, more particularly, to a projection headset that can provide a virtual keypad or other interactive image and method of use.

BACKGROUND

As modern headsets become lighter and more comfortable to wear, a user may continue to wear the headset after a conversation and await the next conversation without removing the headset. Furthermore, it may be the desire of the headset user to dial out from the headset or input other headset-related data into the headset without requiring the headset to be taken off or coupled to another device for data input.

However, current means and methods do not allow for easily inputting data related to the headset without requiring the headset to be taken off. Simply adding a mechanical keypad to a headset makes the headset have a form factor similar to a handset negating the advance in both smaller compact designs and comfort of a headset. Adding a display to a headset would require the user to have the headset in a position where the display was visible in order to read the display, usually requiring the user to take off the headset from the user's head.

Thus, a headset and method for easily entering data without requiring the headset to be in the user's sight or requiring the headset to be doffed is highly desirable.

SUMMARY

The present invention provides a headset apparatus configured to provide a virtual keypad or other interactive image and a method for inputting data into a headset, such as a telephone number to be dialed, while the headset is being worn or used.

In one embodiment of the present invention, a headset includes a processor, at least one acoustic transducer, a projector operably coupled to the processor for displaying an image on a surface exterior to the headset, and a position detector operably coupled to the processor for determining an image position and a user finger position.

In accordance with another embodiment of the present invention, another headset includes a processor, at least one acoustic transducer, a projector operably coupled to the processor for displaying a keypad image on a surface exterior to the headset, and a position detector operably coupled to the processor for determining a keypad image position, a user finger position, and user finger movement relative to the keypad image to input alpha-numeric text.

In accordance with yet another embodiment of the present invention, a method of inputting data with a headset is provided, the method comprising providing a headset as described above, projecting a keypad image on a surface exterior to the headset, determining a position of the keypad image, determining a position of a user finger; and determining user finger movement relative to the keypad image to enter alpha-numeric text from the keypad image.

Advantageously, the present invention permits a headset user to easily display and/or input headset-related data without requiring the headset to be taken off or attached to another device. Furthermore, the present invention maintains the form factor of a headset but also includes the features normally associated with a handset, PDA, or other mobile device with a physical keypad.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

The present invention provides a headset apparatus configured to provide an interactive image, such as a virtual keypad, and a method for inputting headset-related data. In one example, the headset is able to display and acquire data while the headset is being worn by the user.

Figure 1A:
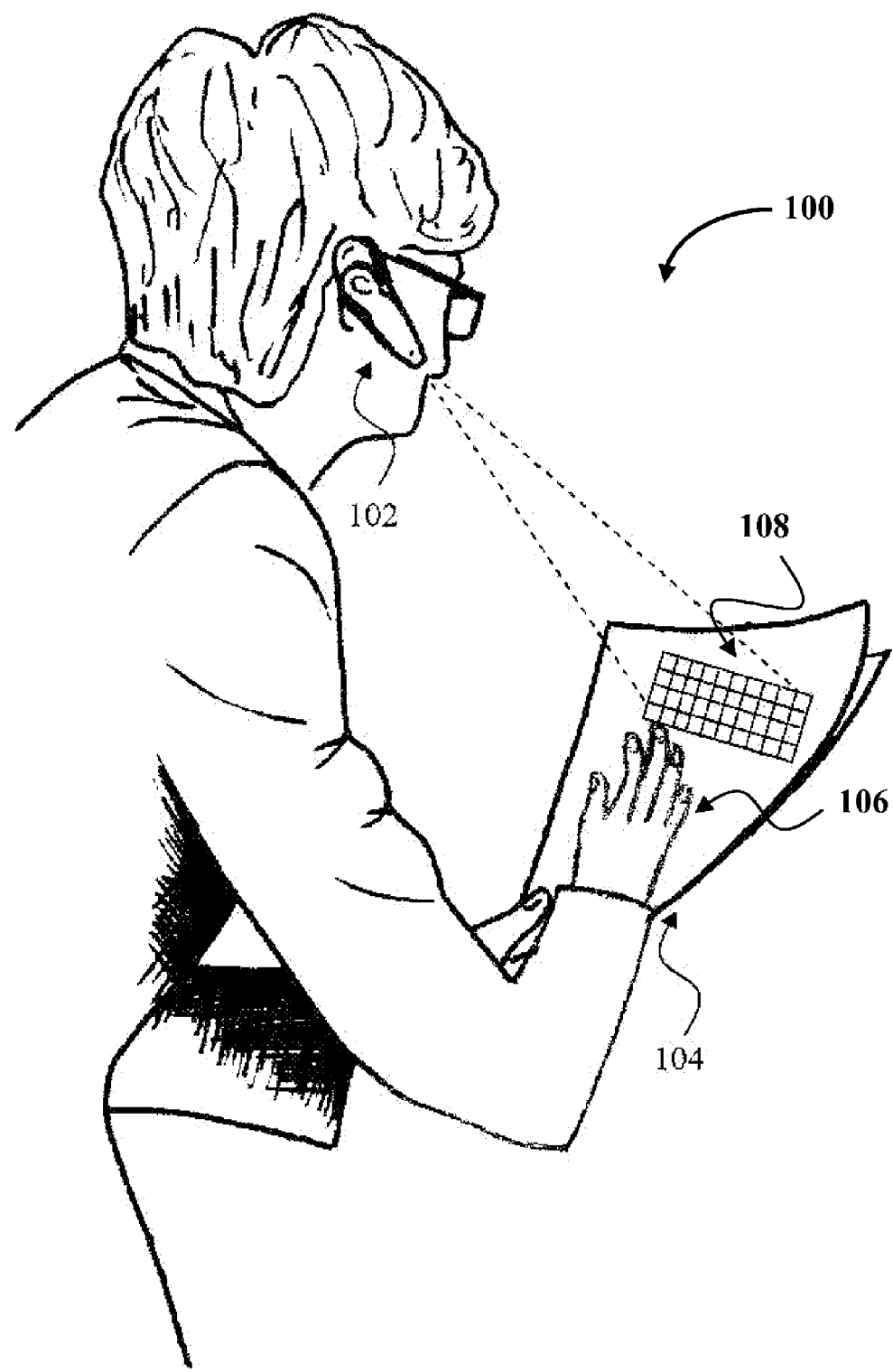
FIG. 1A shows a headset of the present invention in use in accordance with an embodiment of the present invention.
Figure 1B:
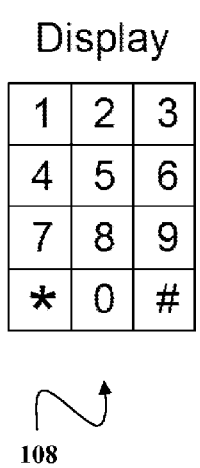
FIGS. 1B-1D illustrate the selection of a key on a keypad in accordance with an embodiment of the present invention.
Figure 1C:
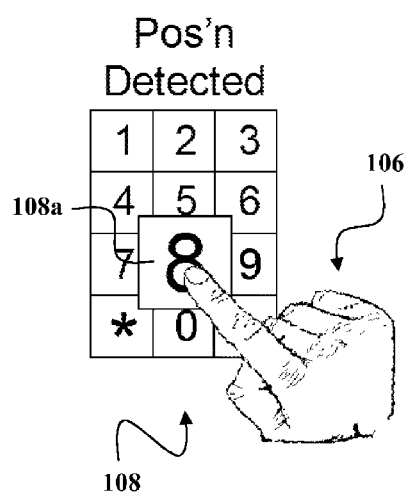
Figure 1D:
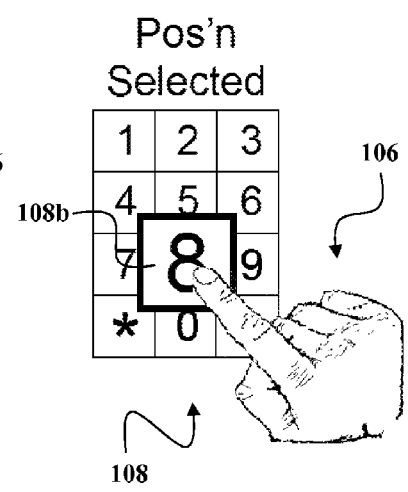

Referring now to FIGS. 1A-1D, a system 100 including a headset 102 and an image surface 104 is illustrated in accordance with an embodiment of the present invention. FIG. 1A illustrates headset 102 of the present invention projecting an image 108 (e.g., a virtual keypad) on surface 104 (e.g., a piece of paper). User fingers 106 are able to "interact" with image 108 to enter data into the headset. FIGS. 1B-1D illustrate examples of a keypad image 108 in which a user-specified key (e.g., key numeral 8) is detected (e.g., by a finger tap), as shown by the enlarged key 108a (FIG. 1C), and then selected (e.g., by a second finger tap), as shown by the highlighted key 108b (FIG. 1D)

Figure 2A:
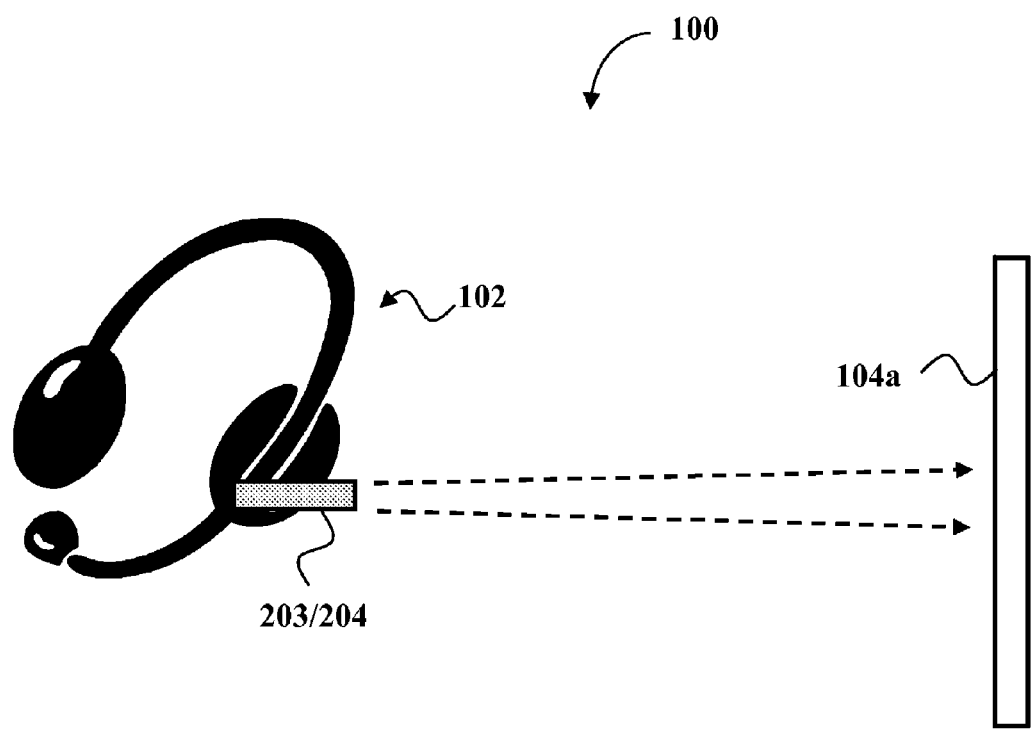
FIG. 2A shows a system including a headset for displaying an image on a surface exterior to the headset in accordance with an embodiment of the present invention.
Figure 2B:
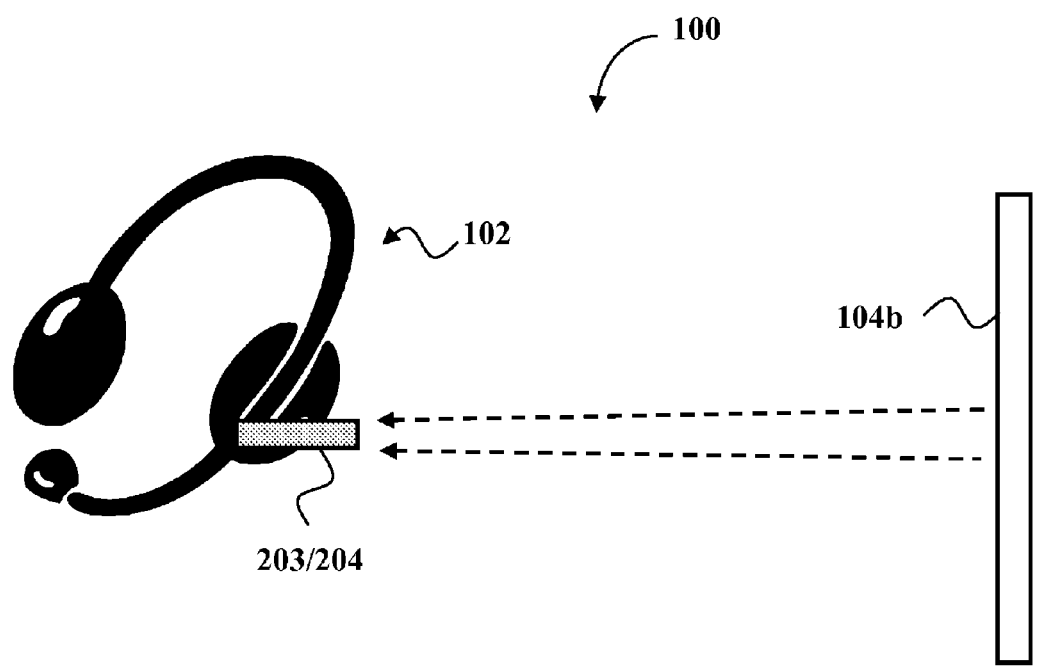
FIG. 2B shows a system including a headset for acquiring data from a user's hand movements relative to an image on a surface exterior to the headset in accordance with an embodiment of the present invention.

Referring now to FIGS. 2A-2B in conjunction with FIGS. 1A-1D, headset 102 includes a position detector 203 and a projector 204. A surface 104a displays an image from headset 102 (as shown in FIG. 2A), and the position of a surface 104b, for example the user's fingers, is triangulated or scanned in one example to capture or acquire movement of user fingers 106 (as shown in FIG. 2B). Position detector 203 detects and determines user finger movement or keystroke relative to the image 108.

In one embodiment of the present invention, headset 102 projects image 108 via emitted light from projector 204, in one example a laser, allowing the image to be seen in front of the headset user on surface 104a. The projected image may include a keypad having various alpha-numeric text to provide text and symbols found on a conventional keyboard or keypad. In another embodiment, projector 204 may also be able to display other images, such as icons related to headset functions (e.g., headset settings, battery life, reception strength, telephone book entries), MP3 song titles, full motion video, time, date, and so on. The image projector may be used for various purposes, including but not limited to identifying callers, viewing headset settings, displaying alpha-numeric text while using voice-dialing or voice data entry, or showing pictures or video. The projected image can be displayed on and data acquired from various surfaces exterior to the headset, including but not limited to the user's hand, a piece of paper, desktop, wall, and so on.

Headset 102 may be wired or wireless. In one example, headset 102 may be wired to an adaptor which is coupled to a network, or headset 102 may be wirelessly coupled to an access point (AP), which is operably coupled to a network. In one example, the network may be a communications network which may include a public switched telephone network (PSTN), an integrated services digital network (ISDN), a local area network (LAN), and/or a wireless local area network (WLAN), that supports standards such as Ethernet, wireless fidelity (WiFi), and/or Voice over Internet Protocol (VoIP).

In accordance with an embodiment of the present invention, an AP includes a transceiver and a processor configured to allow a wireless device (e.g., a headset) access to a network connected to the access point (e.g., via a 10/100 Ethernet RJ-45 port). An AP may be any device that allows wireless-equipped computers and other devices to communicate with a wired network. In one example, an AP is able to support WiFi in general, and the 802.11a, 802.11b, and/or 802.11g wireless networking standards in particular. In other examples, the AP may be able to support other wireless networking standards.

Figure 3:
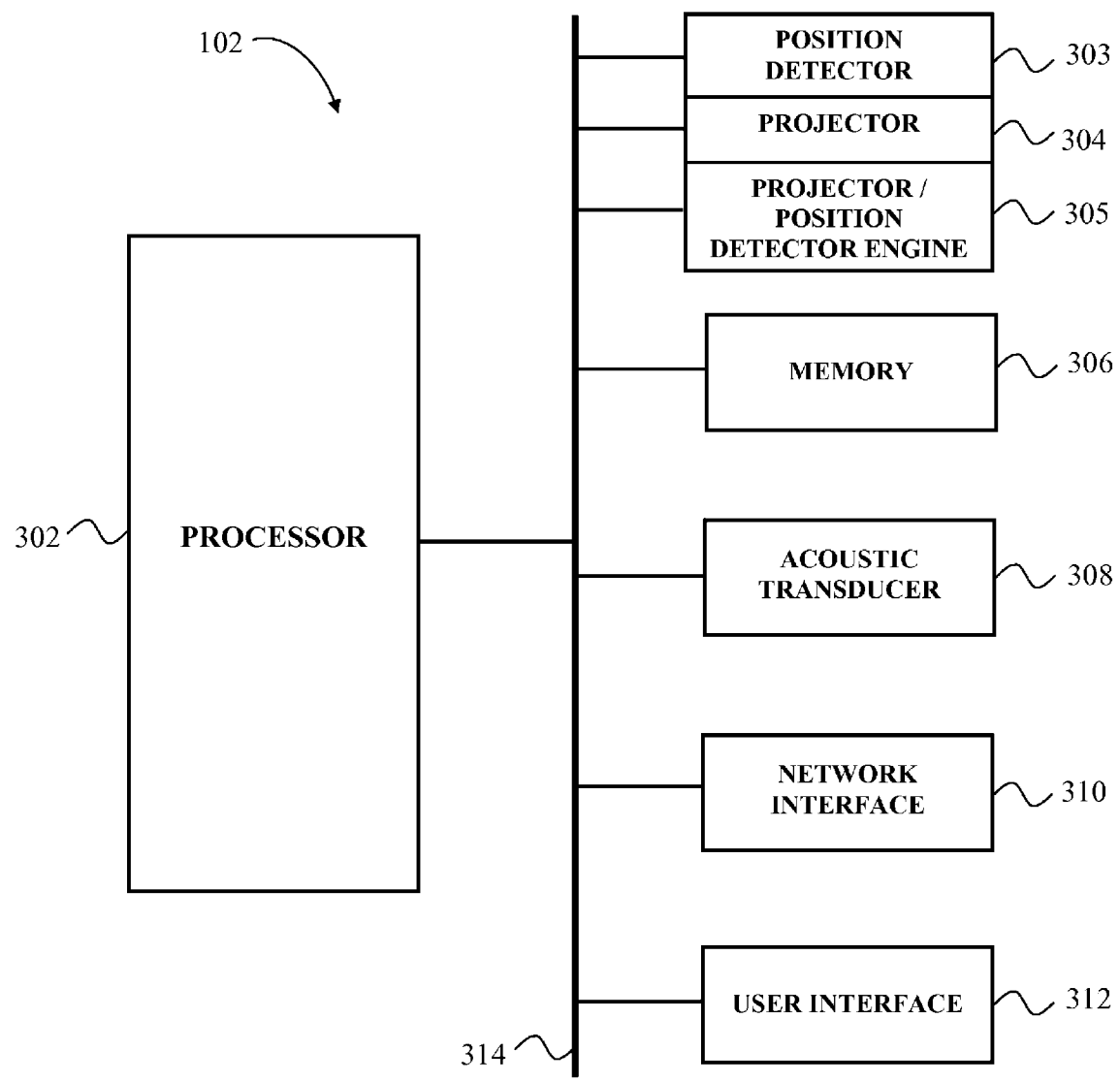
FIG. 3 shows a block diagram of a headset for displaying an image and acquiring data in accordance with an embodiment of the present invention.

Referring now to FIG. 3 in conjunction with FIGS. 1A-1D and 2A-2B, a block diagram of an example of headset 102 is shown in accordance with an embodiment of the present invention. Headset 102 includes a processor 302 operably coupled via a bus 314 to a position detector 303, a projector 304, a projector/position detector engine 305, a memory 306, a transducer 308, a network interface 310, and a user interface 312.

Processor 302 allows for processing data, in particular managing data between position detector 303, projector 304, and projector/position detector engine 305, and optionally between memory 306, transducer 308, network interface 310, and user interface 312, for projecting keypad images via projector 304 and acquiring data via position detector 303. Processor 302 may also process information about access points, service providers, and service accounts. In one example, processor 302 is a high performance, highly integrated, and highly flexible system-on-chip (SOC), including signal processing functionality such as echo cancellation/reduction and gain control in another example. Processor 302 may include a variety of processors (e.g., digital signal processors), conventional CPUs being applicable.

In one example, projector 304 includes a laser operably coupled to optics (e.g., a mirror, lens, and/or prism) and projector engine 305 includes a display engine (e.g., software, hardware, and/or firmware). An applicable laser and optics may be miniature in size and can be coupled to a low-power display engine for creating a high-quality image on a surface, at various distances, without the need for focusing. By using laser light, a focal point is not required and the image is of high quality and legibility. Distance from the headset to the target surface, power, and brightness of the laser are parameters for use, with a large distance for a highly lit area requiring more power for the laser in typical cases. In one example, projector engine 305 can encode data for displaying images, and can be integrated with processor 302 or projector 304, stored in memory 306, or can be an individual component of headset 102.

One example of an applicable laser of projector 304, with no intention to limit the invention thereby, is available from Symbol Technologies, Inc. of Holtsville, N.Y. A laser may have a resolution of VGA 640×480, 16 levels of gray scale, a sharp image (within focus) at 5 inches to infinity in a package occupying less than about 0.2 square inches. The laser is relatively light-weight, requires relatively low power (e.g., on the order of 50 mW), and has image capture and bar-code capture functionality. Another example of an applicable laser is available from Virtual Devices, Inc. of Allison Park, Pa.

In another embodiment of the projection headset, available liquid crystal display (LCD) driving techniques with a projecting light source may be used to project images. In this embodiment, projector 304 may include a light source (e.g., a laser) projected from behind an LCD display, thereby shining through the display when the LCD allows light to pass. When the LCD is driven to show text or an image, the projected light is partially blocked, thereby projecting a negative image of that on the LCD onto display surface 104.

Position detector 303 and position detector engine 305 (e.g., including movement recognition software or firmware) are used to detect and determine user finger movement relative to the keypad image. In one example, laser pulses from projector 304 used to display the image can also be used to provide triangulation data to position detector 303, which can include sensors/detectors mounted on the headset, to triangulate the position of the image and finger tips relative to the image. Alternatively, the projected image can be compared with a scanned image provided by position detector 303 including a scanner, and the position of the image and relative position of user finger tips can be determined via software. Position detector engine 305 can decode data for processing scanned images, in one example. Visual and/or auditory feedback can be used to notify the user when a position has been identified/detected and when a key has been selected, as shown in one example in FIGS. 1B-1D.

Examples of applicable position detectors including laser pulse triangulation and/or scanning means and image comparators are available from Symbol Technologies, Inc. of Holtsville, N.Y. and Virtual Devices, Inc. of Allison Park, Pa.

Memory 306 may include a variety of memories, and in one example includes SDRAM, ROM, flash memory, or a combination thereof. Memory 306 may further include separate memory structures or a single integrated memory structure. In one example, memory 306 may be used to store passwords, network and telecommunications programs, and/or an operating system (OS). In one embodiment, memory 306 may store projector/position detector engine 305, acquired images or data, and laser parameters.

Transducer 308 may include an acoustic transducer, such as a microphone, a speaker, or a combination thereof, for transmission of sound (such as from the user's mouth or to the user's ear based upon signals from an audio source). Transducer 308 may also include a plurality of separate transducers for performing different functions. The transducer can be any type of electromagnetic, piezoelectric, or electrostatic type of driving element, or a combination thereof, or another form of driving element, for generating sound waves from the output face of the transducer. In one embodiment, the transducer may receive signals through wireless communication channels, such as by Bluetooth® protocols and hardware, in one example.

Network interface 310 allows for communications with APs, and in one example includes a transceiver for communicating with a wireless local area network (LAN) radio transceiver (e.g., wireless fidelity (WiFi), Bluetooth, ultra wideband (UWB) radio, etc.) for access to a network (e.g., a wireless LAN or the Internet), or an adaptor for providing wired communications to a network. In one example, network interface 310 is adapted to derive a network address for the headset using the headset's electronic serial number, which is used to identify the headset on the network. In one embodiment, the electronic serial number may be the headset's Media Access Control (MAC) address; however, the electronic serial number may be any number that is mappable to a network address. Network interface 310 is adapted to communicate over the network using the network address that it derives for the headset. In one embodiment, network interface 310 is able to transmit and receive digital and/or analog signals, and in one example communicates over the network using IP, wherein the network interface uses the headset's MAC address or another globally unique address as its IP address. In particular, network interface 310 may be operably coupled to a network via the IEEE 802.11 protocol. However, the network interface 310 may communicate using any of various protocols known in the art for wireless or wired connectivity.

An example of an applicable network interface and the Internet protocol layers (and other protocols) of interest for the present invention are described in U.S. Pat. No. 7,376,123 issued May 20, 2008, the full disclosure of which is hereby incorporated by reference for all purposes.

User interface 312 allows for manual communication between the headset user and the headset, and in one example includes an audio and/or visual interface such that a prompt may be provided to the user's ear and/or an LED may be lit.

Figure 4:
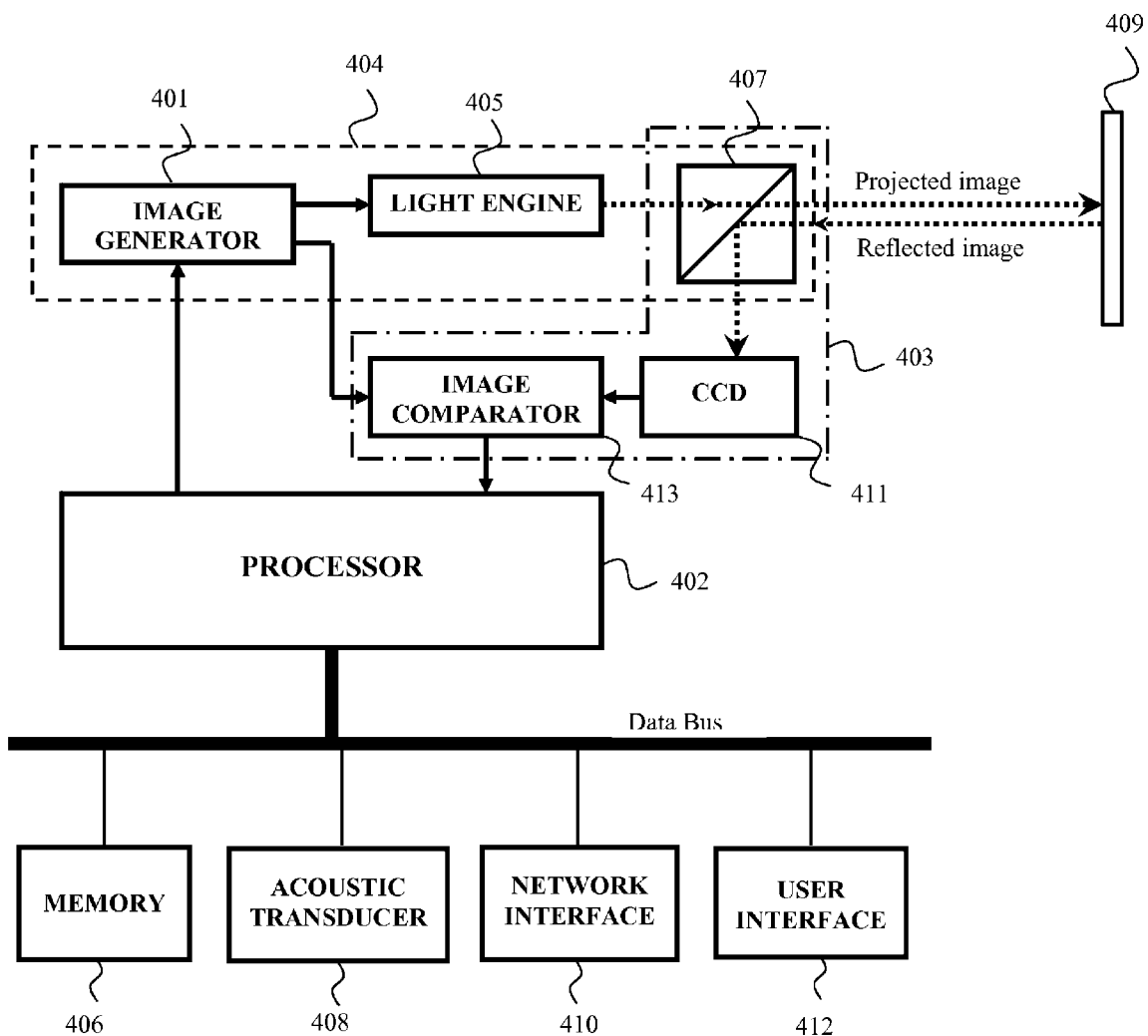
FIG. 4 shows another block diagram of a headset for displaying an image and acquiring data in accordance with another embodiment of the present invention.

Referring now to FIG. 4 in conjunction with FIGS. 1A-1D and 2A-2B, another block diagram is illustrated of a headset for displaying an image and/or acquiring data in accordance with another embodiment of the present invention. An example projection headset of this embodiment includes a processor 402 operably coupled via a data bus to a position detector 403 and a projector 404, and optionally to a memory 406, a transducer 408, a network interface 410, and a user interface 412. Elements such as a processor, a memory, a transducer, a network interface, and a user interface are similar in structure and use as those described above with respect to FIG. 3 and repetitive descriptions may be omitted.

In this embodiment, projector 404 includes an image generator 401, a light engine 405, and an optic 407 (e.g., a mirror, lens, and/or prism) that is configured to project an image, such as a keypad, onto a surface 409. Processor 402 is operably coupled to image generator 401, which sends image data to light engine 405, which provides light through optic 407 to project the desired image onto surface 409.

Position detector 403 includes optic 407, a charge-coupled device (CCD) 411, and an image comparator 413 that is configured to receive a reflected image from surface 409 to determine a position of the image and at least one user finger tip position relative to the image. The reflected image from surface 409 is captured by optic 407 (in this embodiment the same optic as in projector 404 but not necessarily so) and received by CCD 411, which sends reflected image data to image comparator 413, which is operably coupled to image generator 401 and processor 402 and is configured to compare the projected image and the reflected image to determine the image position and the position of at least one user finger tip relative to the projected image. Such position data is then processed to correlate finger(s) position relative to the image to allow for inputting of data in to the headset.

Figure 5:
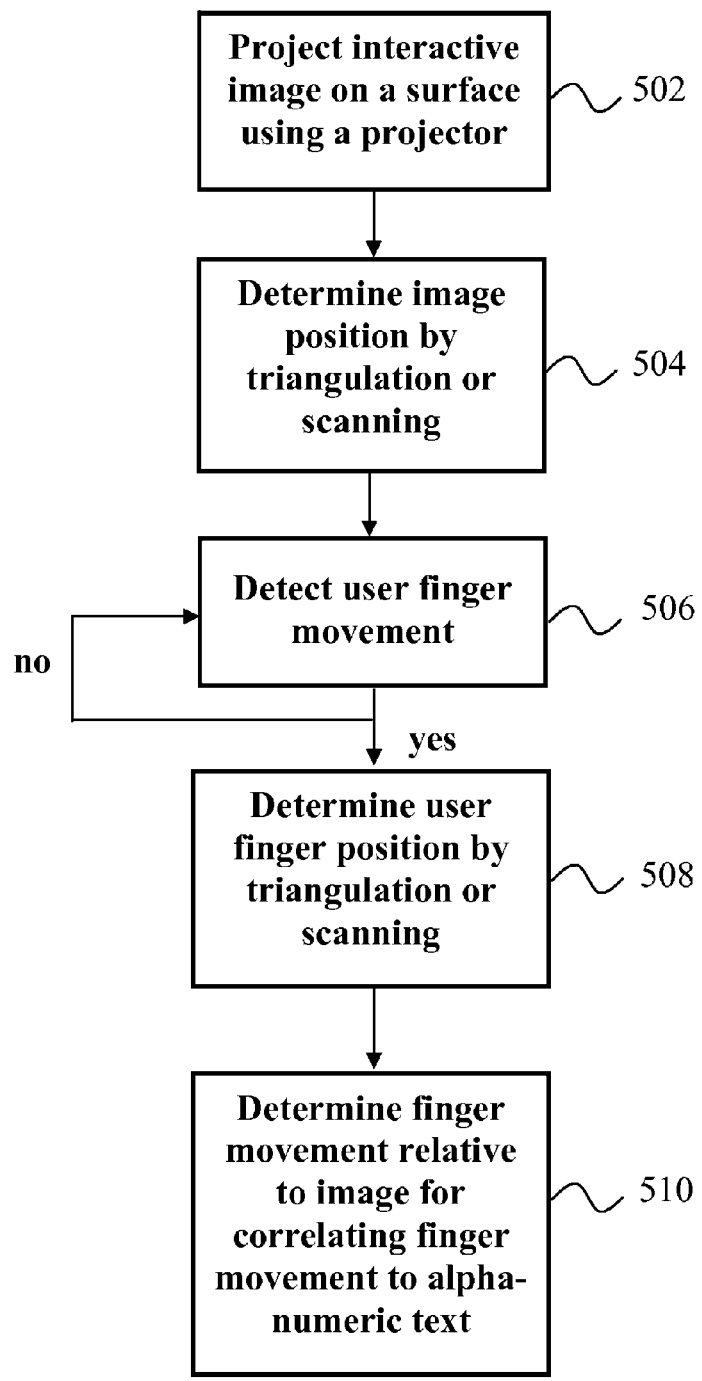
FIG. 5 shows a flowchart of a method for entering data into a headset in accordance with an embodiment of the present invention.

Referring now to FIG. 5, a flowchart of a method for inputting data into headset 102 is illustrated in accordance with an embodiment of the present invention. At step 502, image data is transmitted to a projector engine or an image generator from a processor for producing and/or rendering an image, such as a keypad image, which is then displayed by the projector or light engine and optic of the headset on a surface exterior to the headset. At step 504, the position of the projected image is determined by a position detector through various means and methods, such as by triangulating laser pulses or by scanning and comparing the scanned image to the projected image. At step 506, the projection headset checks for user finger movement and if detected by the position detector, the user finger position(s) is/are determined by triangulation or scanning at step 508. At step 510, the triangulated or scanned data is sent to the processor or position detector engine for determining user finger movement relative to the projected image. The processed data may then be correlated to alpha-numeric text desired to be entered by the user into the headset for various purposes, including but not limited to data entry such as for a telephone/address book, a telephone number to be dialed, email, messaging, storage for later recall and/or transmission over a network, and so on.

Advantageously, the present invention permits a headset user to easily display and/or input data without requiring the headset to be taken off or attached to another device. Furthermore, the present invention maintains the form factor of a headset but can include the features normally associated with a handset, PDA, or other mobile device with a physical keypad.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A headset, comprising:
   a processor;
   at least one acoustic transducer;
   a laser projector operably coupled to the processor and mounted on the headset, the laser projector configured to display for displaying an image on a surface exterior to the headset; and
   a position detector operably coupled to the processor and mounted on the headset, the position detector including an image detector and an image comparator which are configured to compare a projected image and a reflected image for determining a user finger position relative to a position of the projected image.

2. The headset of claim 1, wherein the processor is configured to determine user finger movement relative to the image.

3. The headset of claim 1, wherein the transducer includes one of a speaker and a microphone.

4. The headset of claim 1, wherein the projector includes a laser.

5. The headset of claim 4, wherein the laser is capable of scanning data.

6. The headset of claim 1, wherein the image includes alpha-numeric text and icons.

7. The headset of claim 1, wherein the projector is configured to display images selected from the group consisting of alpha-numeric text, icons, pictures, a caller identification, a telephone number, a time, a date, a headset setting, an MP3 title, and movie data.

8. The headset of claim 1, wherein the projector includes an engine for encoding and decoding data for displaying and scanning images, respectively.

9. The headset of claim 1, further comprising a network interface for wirelessly communicating with a network.

10. The headset of claim 9, wherein the network interface includes a transceiver.

11. The headset of claim 9, wherein the network interface supports one of WiFi, Bluetooth, digital enhanced cordless telecommunications (DECT), and ultra wideband (UWB).

12. A headset, comprising:
   a processor;
   at least one acoustic transducer;
   a laser projector operably coupled to the processor and mounted on the headset, the laser projector configured to display a keypad image on a surface exterior to the headset; and
   a position detector operably coupled to the processor and mounted on the headset, the position detector including a image detector and an image comparator which are configured to compare a projected image and a reflected image for determining a keypad image position, a user finger position, and user finger movement relative to the keypad image to input alpha-numeric text.

13. The headset of claim 12, wherein the projector is configured to display images selected from the group consisting of alpha-numeric text, icons, pictures, a caller identification, a telephone number, a time, a date, a headset setting, an MP3 title, and movie data.

14. The headset of claim 12, wherein the projector includes an engine for encoding and decoding data for displaying and scanning images, respectively.

15. The headset of claim 12, further comprising a network interface for wirelessly communicating with a network.

16. The headset of claim 15, wherein the network interface supports one of WiFi, Bluetooth, digital enhanced cordless telecommunications (DECT), and ultra wideband (UWB).

17. A method of inputting data with a headset, the method comprising:
   providing a headset including a processor, at least one acoustic transducer, a laser projector operably coupled to the processor and mounted on the headset, and a position detector operably coupled to the processor and mounted on the headset for determining an image position and a user finger position;
   projecting a keypad image on a surface exterior to the headset;
   comparing the projected keypad image and a reflected keypad image;
   determining a position of the keypad image;
   determining a position of the user finger; and
   determining user finger movement relative to the keypad image to enter alpha-numeric text from the keypad image.

18. The method of claim 17, further comprising correlating the user finger movement to alpha-numeric text.

19. The method of claim 18, further comprising displaying the alpha-numeric text that is selected.

20. The method of claim 17, wherein the projector is configured to display images selected from the group consisting of alpha-numeric text, icons, pictures, a caller identification, a telephone number, a time, a date, a headset setting, an MP3 title, and movie data.

* * * * *